UNITED STATES PATENT OFFICE.

SIDNEY GILCHRIST THOMAS AND THOMAS TWYNAM, OF WESTMINSTER, ENGLAND.

PROCESS OF OBTAINING PHOSPHORIC ACID FROM METALLURGICAL SLAGS.

SPECIFICATION forming part of Letters Patent No. 306,664, dated October 14, 1884.

Application filed August 14, 1883. (No specimens.) Patented in England January 26, 1883, No. 438, and February 19, 1883, No. 897; in France July 25, 1883, No. 156,730, and in Belgium July 25, 1883, No. 62,132.

*To all whom it may concern:*

Be it known that we, SIDNEY GILCHRIST THOMAS and THOMAS TWYNAM, both of Palace Chambers, Bridge Street, in the city of Westminster, England, subjects of Her Majesty the Queen of Great Britain, have invented a certain new and Improved Process of Treating Metallurgical Phosphoric Slags for the Production of Phosphoric Acid therefrom; and we do hereby declare that the following is a full, clear, and exact description of the invention, which will enable others skilled in the art to which it appertains to make and use the same.

Our invention relates to the production of phosphoric acid from metallurgical slags containing iron oxide and phosphoric acid. It is especially applicable to the utilization of slags produced during the treatment of phosphoric iron by the Thomas-Gilchrist process. The slag is ground, preferably to a condition analogous to fine sand, after having been first broken up, and this may be done by throwing it into water while still hot, while any shots of metallic iron may be separated by the aid of magnets or otherwise. The ground slag is then treated with a sufficient quantity of hydrochloric acid to dissolve out the phosphoric acid it contains. The acid used may be the ordinary commercial strength; but (except when the object aimed at is to produce free phosphoric acid) we always prefer to use an acid more dilute. One containing from five to ten per cent. of real acid we have found to give satisfactory results. The quantity required to dissolve out the phosphoric acid will vary according to the composition of the slag employed. We have found by experiment that good results will be attained when using two parts, by weight, of ordinary commercial hydrochloric acid containing about thirty per cent. of hydrochloric acid to one part of ground slag containing fifteen to twenty per cent phosphoric acid, fifty-five per cent. lime and magnesia, ten per cent. silica, and twelve to fifteen per cent. of oxides of iron; but we do not confine ourselves to the exact proportions. We prefer to treat the slag with the acid in the cold, and to keep the powdered slag well agitated in the liquid during treatment. When the hydrochloric acid is as far neutralized as possible, the solution is run off from the undissolved residue, which said residue contains a great part of the iron and silica originally contained in the slag. This undissolved residue may sometimes be employed in place of oxide of iron in metallurgical operations. The solution run off from the undissolved residue contains most of the phosphoric acid, together with more or less ferric and ferrous oxide. The ferrous oxide contained in it is oxidized by any convenient oxidizing agent, chlorine being the most generally useful. Air or steam may be used either separately or together by passing them into the solution, which is under these circumstances preferably in a heated state, or by running a solution down a tower up which a current of air is passing; or the ferrous oxide in the slag may be oxidized before treating it with hydrochloric acid, and this may be done by heating the powdered slag to a low red heat in a current of air with or without jets of steam. The solution, after the ferrous oxide has been oxidized, is carefully treated with sufficient powdered chalk or dolomite to precipitate all the ferric oxide contained in it as ferric phosphate. The precipitation may readily be performed while the solution is cold; but if the solution be gently heated it is easier to detect when a sufficient quantity of the precipitant has been added. This may be roughly determined by the solution no longer effervescing on addition of chalk. The precipitate of ferric phosphate is filtered off, washed to free it from calcium chloride, and then heated sufficiently to drive off all its water. It is then digested with an excess of strong sulphuric acid of a strength preferably not below a specific gravity of 1.70, in which it will be decomposed, forming ferric sulphate, which is insoluble in the excess of sulphuric acid and free phosphoric acid mixed with the excess of sulphuric acid employed. The decomposition takes place in the cold, but is facilitated by a gentle heat. If acid of a substantially less strength than that specified be employed, or if the ferric phosphate be treated without a preliminary drying and contain much water, it will be necessary to evaporate until the decomposition takes place and the ferric sulphate is precipitated.

The ferric sulphate, when separated from the acid liquid, may be utilized in any one of several known ways, to none of which do we make any claim. Thus it may be either heated so as to effect its decomposition into sulphuric acid and red oxide of iron, (which may be employed as a paint,) or it may be mixed with a suitable quantity of salt and the mass heated in a furnace to form sulphate of soda.

The acid liquid containing the free phosphoric acid and excess of sulphuric acid is preferably employed in the manufacture of superphosphates of lime, in which the phosphoric acid it contains may replace part of the sulphuric acid ordinarily employed; or the mixed solution may be heated in suitable vessels, so as to drive off the sulphuric acid, which is condensed for use again, while the phosphoric acid will be left in a free state. If there was much ferric oxide present in the original solution, it will have carried down the greater part of the phosphoric acid, and by increasing the amount of ferric oxide in the solution by adding oxide of iron all the phosphoric acid may, if desired, be thus carried down. As a rule, however, the filtrate from which the ferric phosphate has been separated contains the greater part of the phosphoric acid. There is added to the solution sufficient lime to precipitate the phosphoric acid it contains. We prefer to add only just sufficient lime to cause the precipitation of all the phosphoric acid, and to leave any oxide of manganese and magnesia in solution, the phosphate of lime going down as a bibasic phosphate. It is separated from the solution and well washed to free it from calcium chloride. As the washings dissolve out some phosphoric acid, they may be used to dilute the acid required for the next lot of slag treated.

In place of lime, chalk may be employed, which must be very well agitated in the liquid, which is kept in a gently-heated state. This entirely prevents the coprecipitation of oxide of manganese and magnesia. Sometimes, when the amount of ferrous oxide is not large—as, for instance, when the slag has had a preliminary roasting—the oxidation may be omitted, the ferric oxide only being precipitated by chalk, as before. The phosphate of lime is then precipitated by just a sufficient amount of lime or by well agitating with chalk; but this precipitation of the phosphate of lime forms no part of the present invention.

Having thus described our invention, we would have it understood that we do not claim the mere treatment of mineral phosphates with sulphuric acid, as we are aware this has been before done; nor do we claim the precipitation of phosphoric acid by lime from acid solutions; but

What we claim, and desire to secure by Letters Patent, is—

The process of treating phosphoric metallurgic slags to obtain phosphoric acid, which consists in dissolving the same in dilute hydrochloric acid and adding a lime salt in just sufficient quantity to precipitate the iron as ferric phosphate, and filtering off or otherwise separating the solution of free phosphoric acid, substantially as set forth.

SIDNEY GILCHRIST THOMAS.
THOMAS TWYNAM.

Witnesses:
THOMAS LAKE,
HERBERT E. DALE,
Both of No. 17 Gracechurch Street, London.